United States Patent

Suumen et al.

[11] Patent Number: 6,007,322
[45] Date of Patent: Dec. 28, 1999

[54] BACK-FLOW PREVENTION APPARATUS

[75] Inventors: Hiroyoshi Suumen, Sakura; Masaaki Konno, Chiba, both of Japan

[73] Assignee: Sumitomo Heavy Industries, Ltd., Japan

[21] Appl. No.: 09/106,108

[22] Filed: Jun. 29, 1998

[30] Foreign Application Priority Data

Jul. 18, 1997 [JP] Japan ..................................... 9-193739

[51] Int. Cl.[6] .................................................. B29C 45/52
[52] U.S. Cl. ........................................... 425/557; 425/563
[58] Field of Search ................... 425/557, 559, 425/563

[56] References Cited

U.S. PATENT DOCUMENTS

| 4,643,665 | 2/1987 | Zeiger | 425/563 |
| 5,112,213 | 5/1992 | Oas | 425/563 |

Primary Examiner—Tim Heitbrink
Attorney, Agent, or Firm—Lorusso & Loud

[57] ABSTRACT

A back-flow prevention apparatus includes a screw which includes a metering portion and a screw head; a seal ring which is removably disposed on a rear portion of the screw head and which has a first resin passageway formed therein; a back-flow prevention ring which is disposed on a front portion of the screw head in such a manner as to be rotatable with respect to the seal ring and which has a second resin passageway formed therein; and a drive unit for selectively rotating the screw in a regular or reverse direction. A first positioning mechanism is disposed between the screw head and the seal ring and adapted to position the seal ring at a predetermined position with respect to the screw head. A second positioning mechanism is disposed between the screw head and the back-flow prevention ring and adapted to establish communication between the first resin passageway and the second resin passageway when the screw is rotated in the regular direction and to break the communication between the first resin passageway and the second resin passageway when the screw is rotated in the reverse direction. The second positioning mechanism also positions the back-flow prevention ring with respect to the screw head. The back-flow prevention apparatus can prevent resin movement associated with suck-back.

5 Claims, 3 Drawing Sheets

BACK-FLOW PREVENTION APPARATUS

BACKGROUND OF THE INVENTION

1. Field of the Invention

The present invention relates to a back-flow prevention apparatus.

2. Description of the Related Art

Conventionally, an injection molding machine has an injection unit. The injection unit has a heating cylinder in which a screw is disposed rotatably and in an advancingly-retreatively movable manner. Drive means rotates and advances or retreats the screw. In a metering step, the screw is retreated while being rotated in a regular direction, so that resin drops from a hopper and is melted and stored in a space located ahead of a screw head. In an injection step, the screw is advanced so as to inject the resin melt into a mold from an injection nozzle.

FIG. 1 shows a longitudinal sectional view of a main portion of a conventional injection unit.

In FIG. 1, reference numeral 11 denotes a heating cylinder. The heating cylinder 11 has an injection nozzle 13 at its front end (left-hand end in FIG. 1). In the heating cylinder 11, a screw 12 is disposed rotatably and in an advancingly-retreatively movable manner. Unillustrated drive means rotates and advances or retreats the screw 12.

The screw 12 extends rearward (to the right in FIG. 1) within the heating cylinder 11. The screw 12 is connected at its rear end to the drive means and has a screw head 14 at its front end. A spiral flight 15 is formed on the surface of a metering portion 18 to thereby form a groove 16 along the flight 15.

In the thus-configured injection unit, in a metering step, the drive means is activated so as to retreat (move to the right in FIG. 1) the screw 12 while rotating the screw 12 in a regular direction. Resin pellets contained in an unillustrated hopper enter the heating cylinder 11 and are advanced (moved to the left in FIG. 1) through the groove 16. While being advanced through the groove 16, resin pellets are melted by an unillustrated heater, and resin melt is stored in a space located ahead of the screw head 14.

In an injection step, the drive means is activated so as to advance the screw 12. The resin stored in the space located ahead of the screw head 14 is injected into an unillustrated mold cavity from the injection nozzle 13, thereby filling the cavity.

In order to prevent backflow of the resin stored in the space located ahead of the screw head 14 in the injection step, a back-flow prevention apparatus is disposed.

Specifically, the screw head 14 has a conical head body portion 21 formed at its front section and a small-diameter portion 19 formed at its rear section. An annular back-flow prevention ring 20 is disposed around the circumference of the small-diameter portion 19, thereby defining a resin passageway 24 between the small-diameter portion 19 and the back-flow prevention ring 20. A seal ring 22 is disposed at the front end of the metering portion 18 such that the seal ring 22 can contact or separate from the rear end of the back-flow prevention ring 20.

Accordingly, in the injection step, when the screw 12 is advanced, the resin stored in the space located ahead of the screw head 14 is urged to move rearward, i.e., to flow rearward. However, resin pressure causes the back-flow prevention ring 20 to move rearward with respect to the screw 12. Thus, the rear end of the back-flow prevention ring 20 abuts the seal ring 22 to thereby effect sealing. As a result, the resin stored in the space located ahead of the screw head 14 is prevented from flowing rearward.

In contrast, in the metering step, when the screw 12 is retreated while being rotated in a regular direction, resin pressure causes the back-flow prevention ring 20 to move forward with respect to the screw 12. Thus, the front end of the back-flow prevention ring 20 abuts the rear end of the head body portion 21. Since axially extending cuts 25 are formed in the head body portion 21 in a plurality of circumferential positions, resin flow is not hindered.

However, in the above-mentioned conventional back-flow prevention apparatus, when suck-back is performed after the metering step is completed and before the injection step is started, the resin contained in the metering portion 18 is moved forward into the space located ahead of the screw head 14, causing variation in resin quantity stored in the space located ahead of the screw head 14.

Also, since through advancement of the screw 12 the flow-back prevention ring 20 is moved rearward with respect to the screw 12 to thereby effect sealing, sealing timing varies depending on the state of kneading and dispersion of resin, resin viscosity, resin temperature, and acceleration to a predetermined speed of the screw 12 at the time of starting the injection step. Accordingly, the quantity of back-flow resin varies.

Thus, there is devised a back-flow prevention apparatus which prevents resin movement associated with suck-back and variation in timing for effecting sealing.

FIG. 2 shows a longitudinal sectional view of a main portion of another conventional injection unit.

In FIG. 2, reference numeral 32 denotes a screw which is disposed rotatably and in an advancingly-retreatively movable manner in an unillustrated heating cylinder. The screw 32 includes a metering portion 33 and a screw head 34 disposed at the tip end of the metering portion 33. A spiral flight 35 is formed on the surface of the metering portion 33 to thereby form a groove 36 along the flight 35. An internal-thread portion 42 is formed at the front end (left-hand end in FIG. 2) of the metering portion 33.

The screw head 34 includes a conical tip portion 37 formed at its front end, a cylindrical body portion 38 formed at its central section, a seal ring portion 39 formed at its rear section and in the form of a flange integral to the body portion 38, and an external-thread portion 41 formed at its rear end. Through screw-engagement between the external-thread portion 41 and the internal-thread portion 42, the screw head 34 can be fixedly attached to the metering portion 33. First resin passageways 45 are formed through the seal ring portion 39 between the front end face of the portion 39 and the rear end face of the portion 39 at a plurality of circumferential positions.

An annular back-flow prevention ring 43 is disposed around the circumference of the body portion 38 such that the rear end of the ring 43 is in the proximity of or in contact with the front ends of the first resin passageways 45. Second resin passageways 46 are formed through the back-flow prevention ring 43 between the front end face of the ring 43 and the rear end face of the ring 43 at a plurality of circumferential positions. A pin 51 is disposed through the body portion 38 at a predetermined position so as to stop rotation of the back-flow prevention ring 43, to bring the rear end of the back-flow ring 43 in the proximity of or into contact with the front end of the seal ring portion 39, and to prevent the back-flow ring 43 from coming off the screw head 34.

Arc engagement grooves 52 are formed in a front end portion of the back-flow prevention ring 43 at positions corresponding to the pin 51, so that both ends of the pin 51 engage the grooves 52. Each of the engagement grooves 52 is formed over a predetermined circumferential angle θ. As both ends of the pin 51 move along the engagement grooves 52, the screw head 34 and the back-flow prevention ring 43 rotate relative to each other by the angle θ. The first resin passageways 45 and the second resin passageways 46 are formed such that the passageways 45 are circumferentially shifted from the passageways 46 by the angle θ. Accordingly, as the screw head 34 and the back-flow prevention ring 43 are rotated relative to each other, the ring 43 assumes either a communication position where the first resin passageways 45 and the second resin passageways 46 align with each other to establish communication therebetween or a shutoff position where the communication between the passageways 45 and 46 is broken.

In the thus-configured back-flow prevention apparatus of an injection unit, in a metering step, when the screw 32 is retreated while being rotated in a regular direction, the screw head 34 is rotated in the same direction as is the screw 32. Accordingly, the seal ring portion 39 and the pin 51 are rotated in the same direction as is the screw 32. However, the back-flow prevention ring 43 remains stationary until the pin 51 abuts end walls of the engagement grooves 52. When the pin 51 abuts the end walls of the engagement grooves 52, the back-flow prevention ring 43 is in the communication position where communication is established between the first resin passageways 45 and the second resin passageways 46. Subsequently, the back-flow prevention ring 43 is rotated in the same direction as is the screw 32.

Accordingly, as the screw 32 is retreated while being rotated in the regular direction, resin contained in the metering portion 33 moves forward through the first and second resin passageways 45 and 46 and is thus stored in a space located ahead of the screw head 34.

When the metering step is completed as above, suck-back is to be performed. Before suck-back is performed, the screw 32 is rotated in a reverse direction by a predetermined angle not smaller than the angle θ. As a result, the screw head 34 is rotated in the same direction as is the screw 32. Accordingly, the seal ring portion 39 and the pin 51 are rotated in the same direction as is the screw 32. However, the backflow prevention ring 43 remains stationary until the pin 51 abuts the other end walls of the engagement grooves 52. When the pin 51 abuts the other end walls of the engagement grooves 52, the back-flow prevention ring 43 is in the shutoff position where the communication between the first resin passageways 45 and the second resin passageways 46 is broken. Subsequently, the back-flow prevention ring 43 is rotated in the same direction as is the screw 32.

Next, suck-back is performed so as to reduce resin pressure within the space located ahead of the screw head 34, thereby preventing the resin stored in the space from oozing through the tip of an unillustrated injection nozzle. At this time, even when the screw 32 is retreated, resin contained in the metering portion 33 does not move forward, thus preventing variation in resin quantity stored in the space located ahead of the screw head 34.

In the subsequent injection step, when the screw 32 is advanced, the resin stored in the space located ahead of the screw head 34 is urged to flow rearward. However, since the back-flow prevention ring 43 is in the shutoff position, the communication between the first resin passageways 45 and the second resin passageways 46 is broken.

As a result, the resin stored in the space located ahead of the screw head 34 can be prevented from flowing rearward.

Thus, the quantity of resin to be injected remains constant, thereby preventing molded products from suffering short shot, burrs, or like defects.

In the thus-configured back-flow prevention apparatus, when the back-flow prevention ring 43 is in the communication position, communication is established between the first resin passageways 45 and the second resin passageways 46; and when the back-flow prevention ring 43 is in the shutoff position, the communication between the passageways 45 and 46 is broken. In order to properly effect the communication/shutoff function, the second resin passageways 46 must be adequately positioned in a circumferential direction with respect to the first resin passageways 45. This positioning can be easily attained through integral formation of the seal ring portion 39 with the body portion 38 and through adequate selection of position of a hole formed in the body portion 38 for receiving the pin 51.

However, the integral formation of the seal ring portion 39 with the body portion 38 involves a drawback that in the case of breakage of the seal ring portion 39, the entire screw head 34 must be replaced, resulting in higher cost.

SUMMARY OF THE INVENTION

An object of the present invention is to solve the above-mentioned problems in the conventional back-flow prevention apparatus and to provide a back-flow prevention apparatus capable of preventing resin movement associated with suck-back and reducing cost.

To achieve the above object, a back-flow prevention apparatus according to the present invention comprises a screw which includes a metering portion and a screw head; a seal ring which is removably disposed on a rear portion of the screw head and which has a first resin passageway formed therein; a back-flow prevention ring which is disposed on a front portion of the screw head in such a manner as to be rotatable with respect to the seal ring and which has a second resin passageway formed therein; and drive means for selectively rotating the screw in a regular or reverse direction.

Between the screw head and the seal ring there is disposed first positioning means for positioning the seal ring at a predetermined position with respect to the screw head. Between the screw head and the back-flow prevention ring there is disposed second positioning means for establishing communication between the first resin passageway and the second resin passageway when the screw is rotated in the regular direction, for breaking the communication between the first resin passageway and the second resin passageway when the screw is rotated in the reverse direction, and for positioning the back-flow prevention ring with respect to the screw head.

In a metering step, when the drive means is activated to rotate the screw in the regular direction, communication is established between the first resin passageway and the second resin passageway. Accordingly, resin contained in the metering portion moves forward through the first and second resin passageways and is then stored in a space located ahead of the screw head.

When the metering step is completed, the screw is rotated in the reverse direction, so that the second positioning means breaks the communication between the first and second passageways.

Accordingly, the subsequent suck-back effected by retreat of the screw does not cause resin contained in the metering portion to move forward. Thus, there can be prevented variation in resin quantity stored in the space located ahead of the screw head.

As a result, the quantity of resin to be injected remains constant, thereby preventing molded products from suffering short shot, burrs, or like defects.

In the subsequent injection step, when the screw is advanced, the resin stored in the space located ahead of the screw head is urged to flow rearward. However, since the back-flow prevention ring is in the shutoff position, the communication between the first resin passageway and the second resin passageway is broken.

As a result, the resin stored in the space located ahead of the screw head can be prevented from flowing rearward. Thus, the quantity of resin to be injected remains constant, thereby preventing molded products from suffering short shot, burrs, or like defects.

Further, since the seal ring and the screw head can be formed as separate elements, in the case of damage to the seal ring, only the seal ring may be replaced, with no need to replace the entire screw head. Thus, the cost of the back-flow prevention apparatus can be reduced.

Also, the seal ring and the screw head may be of different materials. This reduces limitations on selection of materials for the seal ring and the screw head, thereby enabling improvement in durability of the seal ring and the screw head as well as cost reduction.

Further, there is no need for disposing a pin which serves as a rotation-stop for the back-flow prevention ring, thereby suppressing resin stagnation which would otherwise occur due to employment of such a pin. Thus, resin scorch, resin contamination, and the like can be prevented.

In another back-flow prevention apparatus according to the present invention, the screw head is screw-engaged to the metering portion.

In still another back-flow prevention apparatus according to the present invention, the first positioning means comprises a pin provided through the screw head and an engagement groove formed in the seal ring.

In still another back-flow prevention apparatus according to the present invention, the second positioning means comprises a protrusion pair formed on the screw head and an engagement protrusion formed on the back-flow prevention ring.

In still another back-flow prevention apparatus according to the present invention, a fan-shaped groove is formed between the protrusions of the protrusion pair for allowing the engagement protrusion to move within the fan-shaped groove.

BRIEF DESCRIPTION OF THE DRAWINGS

The structure and features of the back-flow prevention apparatus according to the present invention will be readily appreciated as the same becomes better understood by referring to the drawings, in which.

DESCRIPTION OF THE PREFERRED EMBODIMENT

An embodiment of the present invention will next be described in detail with reference to the drawings.

Figure 1:
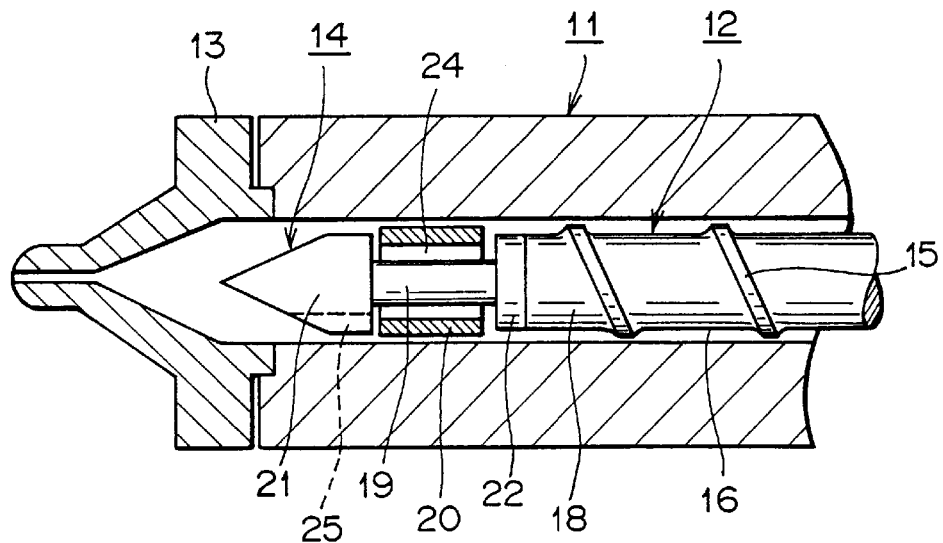
FIG. 1 is a longitudinal sectional view of a main portion of a conventional injection unit.
Figure 2:
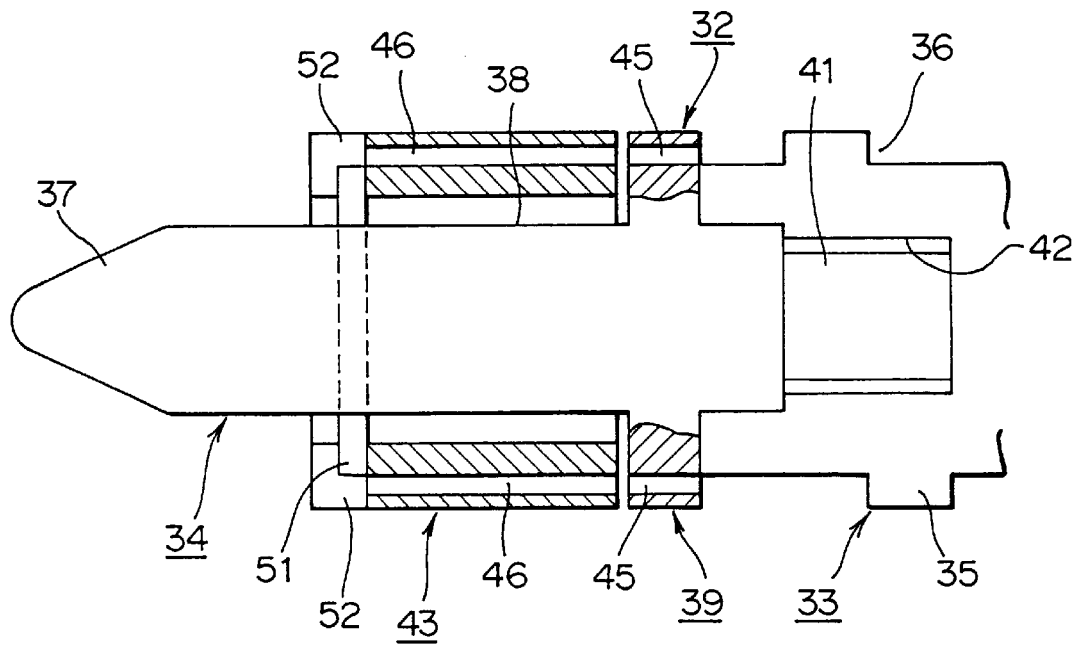
FIG. 2 is a longitudinal sectional view of a main portion of another conventional injection unit.
Figure 3:
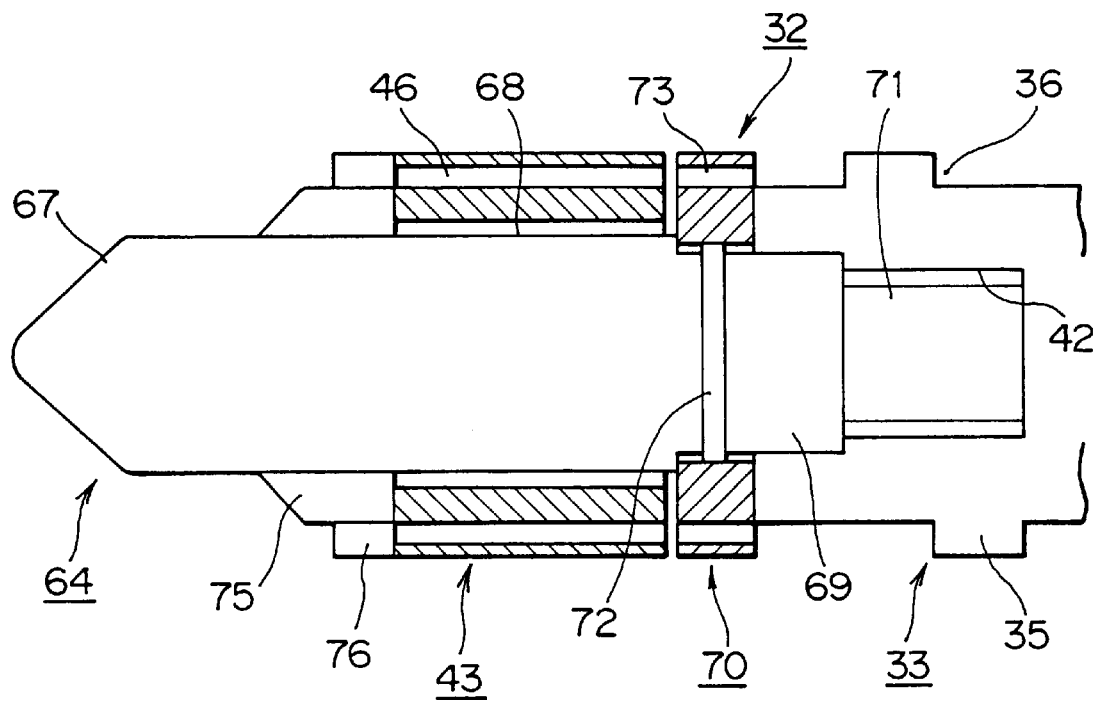
FIG. 3 is a longitudinal sectional view of a main portion of an injection unit according to an embodiment of the present invention.
Figure 4:
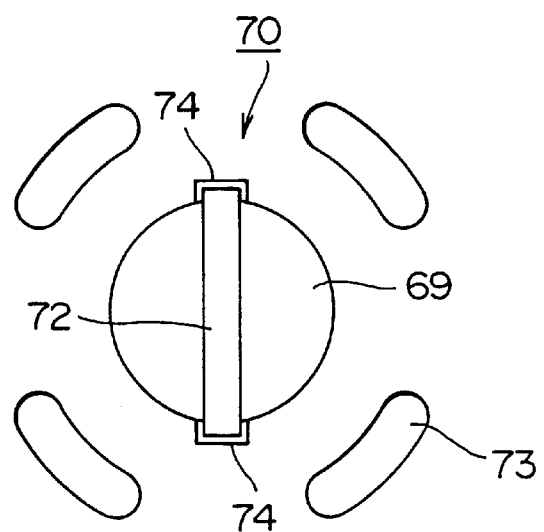
FIG. 4 is a transverse sectional view of a main portion of the injection unit of the embodiment.
Figure 5:
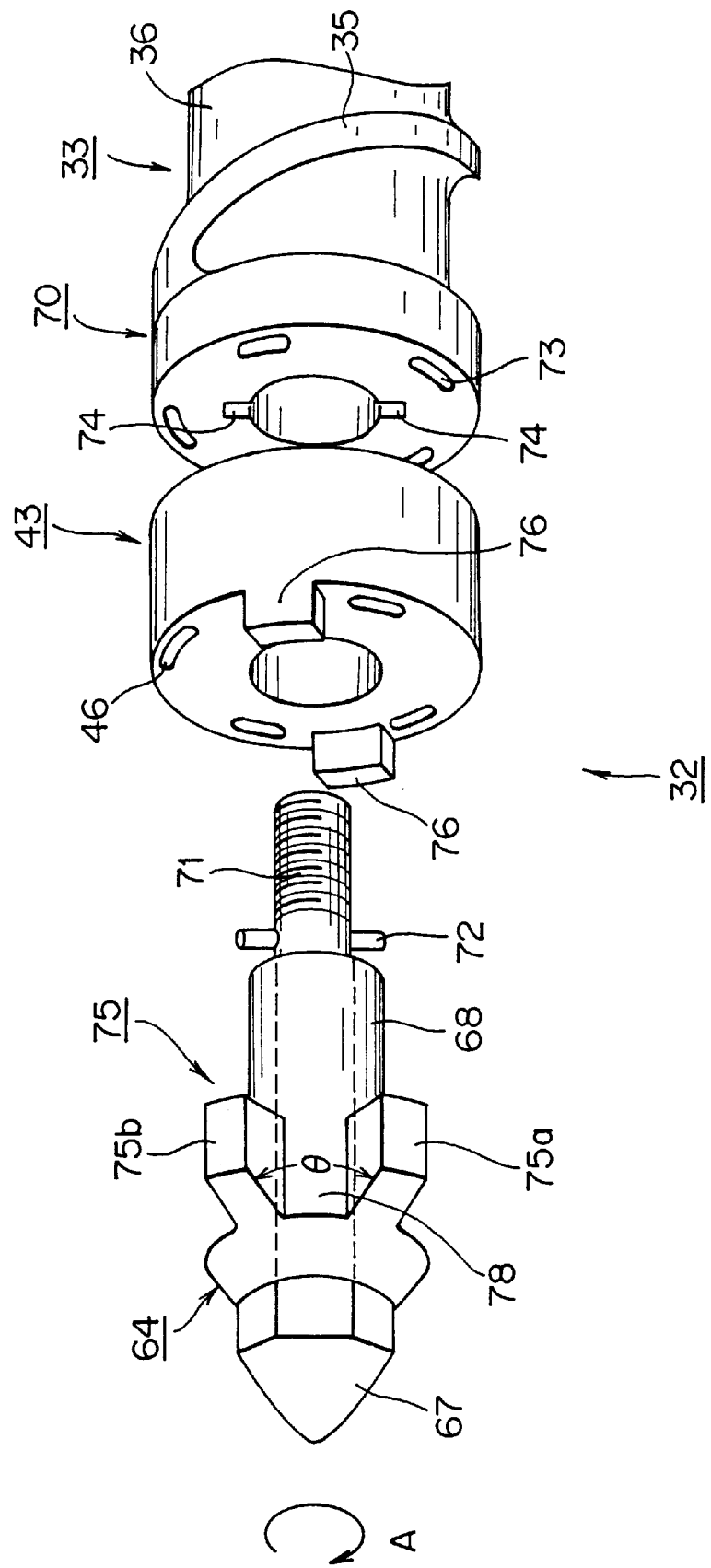
FIG. 5 is an exploded perspective view of a main portion of the injection unit of the embodiment.

FIG. 3 is a longitudinal sectional view of a main portion of an injection unit according to an embodiment of the present invention; FIG. 4 is a transverse sectional view of a main portion of the injection unit of the embodiment; and FIG. 5 is an exploded perspective view of a main portion of the injection unit of the embodiment.

In these drawings, reference numeral 32 denotes a screw which is disposed rotatably and in an advancingly-retreatively movable manner in an unillustrated heating cylinder. The screw 32 includes a metering portion 33 and a screw head 64 disposed at the tip end of the metering portion 33. A spiral flight 35 is formed on the surface of the metering portion 33 to thereby form a groove 36 along the flight 35. An internal-thread portion 42 is formed at the front end (left-hand end in FIG. 3) of the metering portion 33.

The screw head 64 includes a conical tip portion 67 formed at its front end, a cylindrical body portion 68 formed at its central section, a small-diameter engagement portion 69 formed at its rear section, and an external-thread portion 71 formed at its rear end. An annular seal ring 70 is removably disposed around the circumference of the engagement portion 69. To attain this disposal, two engagement grooves 74 are formed in the inner circumferential surface of the seal ring 70. Also, a pin 72 is disposed through the engagement portion 69 such that both ends of the pin 72 engage the corresponding engagement grooves 74.

Through screw-engagement between the external-thread portion 71 and the internal-thread portion 42, the screw head 64 can be fixedly attached to the metering portion 33. First resin passageways 73 are formed through the seal ring 70 between the front end face of the ring 70 and the rear end face of the ring 70 at a plurality of circumferential positions.

An annular back-flow prevention ring 43 is disposed around the circumference of the body portion 68 such that the rear end (right-hand end in FIG. 3) of the ring 43 is in the proximity of or in contact with the front end of the seal ring 70. Second resin passageways 46 are formed through the back-flow prevention ring 43 between the front end face of the ring 43 and the rear end face of the ring 43 at a plurality of circumferential positions. In order to stop rotation of the backflow prevention ring 43, bring the rear end of the ring 43 in the proximity of or in contact with the front end of the seal ring 70, and prevent the back-flow prevention ring 43 from coming off the screw head 64, protrusion pairs 75 are formed on the body portion 68 at a plurality of circumferential positions such that a fan-shaped groove 78 is formed between protrusions 75a and 75b of each protrusion pair 75.

Arc engagement protrusions 76 corresponding to the protrusion pairs 75 are formed at a front end portion of the back-flow prevention ring 43 so as to engage the corresponding fan-shaped grooves 78. Each of the fan-shaped grooves 78 is formed over a predetermined circumferential angle θ. As the engagement protrusions 76 move within the corresponding fan-shaped grooves 78, the screw head 64 and the backflow prevention ring 43 rotate relative to each other by the angle θ. As the screw head 64 and the back-flow prevention ring 43 rotate relative to each other, the first and second resin passageways 73 and 46 are circumferentially shifted from each other by an angle of up to θ. Accordingly, as the screw head 64 and the back-flow prevention ring 43 are rotated relative to each other, the ring 43 assumes either a communication position where the first resin passageways 73 and the second resin passageways 46 align with each other to establish communication therebetween or a shutoff position where the communication between the passageways 73 and 46 is broken.

In the thus-configured injection unit, in a metering step, when unillustrated drive means is activated so as to retreat the screw 32 while rotating the screw 32 in a regular direction (the direction of the arrow A of FIG. 5), the screw head 64 is rotated in the same direction as is the screw 32. Accordingly, the seal ring 70 and the protrusion pairs 75 are rotated in the same direction as is the screw 32. However, the back-flow prevention ring 43 remains stationary until the engagement protrusions 76 abut the corresponding protrusions 75a of the protrusion pairs 75. When the engagement protrusions 76 abut the protrusions 75a, the back-flow prevention ring 43 is in the communication position where communication is established between the first resin passageways 73 and the second resin passageways 46. Subsequently, the back-flow prevention ring 43 is rotated in the same direction as is the screw 32.

Accordingly, as the screw 32 is retreated while being rotated in the regular direction, resin contained in the metering portion 33 moves forward through the first and second resin passageways 73 and 46 and is thus stored in a space located ahead of the screw head 64.

When the metering step is completed as above, suck-back is performed. Before suck-back is performed, the screw 32 is rotated in a reverse direction by a predetermined angle not smaller than the angle θ. As a result, the screw head 64 is rotated in the same direction as is the screw 32. Accordingly, the seal ring 70 and the protrusion pairs 75 are rotated in the same direction as is the screw 32. However, the back-flow prevention ring 43 remains stationary until the engagement protrusions 76 abut the corresponding other protrusions 75b of the protrusion pairs 75. When the engagement protrusions 76 abut the other protrusions 75b, the back-flow prevention ring 43 is in the shutoff position where the communication between the first resin passageways 73 and the second resin passageways 46 is broken. Subsequently, the backflow prevention ring 43 is rotated in the same direction as is the screw 32.

Next, suck-back is performed so as to reduce resin pressure within the space located ahead of the screw head 64, thereby preventing the resin stored in the space from oozing through the tip of an unillustrated injection nozzle. At this time, even when the screw 32 is retreated, resin contained in the metering portion 33 does not move forward, thus preventing variation in resin quantity stored in the space located ahead of the screw head 64.

When the screw 32 is rotated in the reverse direction, the screw 32 is urged to move forward due to a screw effect. To prevent this forward movement of the screw 32, the drive means holds the screw 32 in a metering-step completion position within the heating cylinder.

In the subsequent injection step, when the screw 32 is advanced, the resin stored in the space located ahead of the screw head 64 is urged to flow rearward. However, since the back-flow prevention ring 43 is in the shutoff position, the communication between the first resin passageways 73 and the second resin passageways 46 is broken.

As a result, the resin stored in the space located ahead of the screw head 64 can be prevented from flowing rearward. Thus, the quantity of resin to be injected remains constant, thereby preventing molded products from suffering short shot, burrs, or like defects.

In the thus-configured back-flow prevention apparatus of an injection unit, when the back-flow prevention ring 43 is in the communication position, communication is established between the first resin passageways 73 and the second resin passageways 46; and when the back-flow prevention ring 43 is in the shutoff position, the communication between the passageways 73 and 46 is broken. In order to properly effect the communication/shutoff function, the second resin passageways 46 must be adequately positioned in a circumferential direction with respect to the first resin passageways 73. This positioning can be easily attained through formation of the protrusion pairs 75 on the body portion 68 at predetermined positions so as to establish the engagement between the fan-shaped grooves 78 and the corresponding engagement protrusions 76 of the back-flow prevention ring 43 to thereby adequately position the back-flow prevention ring 43 with respect to the screw head 64 and through the engagement between both ends of the pin 72 and the engagement grooves 74 to thereby adequately position the seal ring 70 with respect to the screw head 64. The pin 72 and the engagement grooves 74 serve as the first positioning means of the invention. The protrusion pairs 75 and the engagement protrusions 76 serve as the second positioning means of the invention.

Accordingly, through adequate selection of position of an unillustrated hole formed in the engagement portion 69 for receiving the pin 72 and through adequate selection of position of the engagement grooves 74 formed in the seal ring 70, the second resin passageways 46 can be readily and adequately positioned with respect to the first resin passageways 73.

Since the seal ring 70 and the body portion 68 can be formed as separate elements, in the case of damage to the seal ring 70, only the seal ring 70 may be replaced, with no need to replace the entire screw head 64. Thus, the cost of the back-flow prevention apparatus can be reduced.

Also, the seal ring 70 and the screw head 64 may be of different materials. This reduces limitations on selection of materials for the seal ring 70 and the screw head 64, thereby enabling improvement in durability of the seal ring 70 and the screw head 64 as well as cost reduction.

Further, there is no need for disposing a pin which serves as a rotation-stop for the back-flow prevention ring 43, thereby suppressing resin stagnation which would otherwise occur due to employment of such a pin. Thus, resin scorch, resin contamination, and the like can be prevented.

The present invention is not limited to the above-mentioned embodiment. Numerous modifications and variations of the present invention are possible in light of the spirit of the present invention, and they are not excluded from the scope of the present invention.

What is claimed is:

1. A back-flow prevention apparatus, comprising:

(a) a screw which includes a metering portion and a screw head;

(b) a seal ring which is removably disposed on a rear portion of said screw head and which has a first resin passageway formed therein;

(c) a back-flow prevention ring which is disposed on a front portion of said screw head in such a manner as to be rotatable with respect to said seal ring and which has a second resin passageway formed therein; and (d) drive means for selectively rotating said screw in a regular and reverse direction; wherein (e) a first positioning means is disposed between said screw head and said seal ring and adapted to position said seal ring at a predetermined position with respect to said screw head; and (f) a second positioning means is disposed between said screw head and said back-flow prevention ring and adapted to establish communication between said first resin passageway and said second resin passageway when said screw is rotated in a forward direction, to break the communication between said first resin passageway and said second resin passageway when said screw is rotated in a reverse direction, and to position said back-flow prevention ring with respect to said screw head.

2. A back-flow prevention apparatus according to claim 1, wherein said screw head is screw-engaged to said metering portion.

3. A back-flow prevention apparatus according to claim 1, wherein said first positioning means comprises a pin provided through said screw head and an engagement groove formed in said seal ring.

4. A back-flow prevention apparatus according to claim 1, wherein said second positioning means comprises a protrusion pair formed on said screw head and an engagement protrusion formed on said back-flow prevention ring.

5. A back-flow prevention apparatus according to claim 4, wherein a fan-shaped groove is formed between the protrusions of said protrusion pair for allowing said engagement protrusion to move within said fan-shaped groove.

* * * * *